(12) United States Patent  (10) Patent No.: US 8,810,511 B2
Huntzicker et al.  (45) Date of Patent: Aug. 19, 2014

(54) HANDHELD ELECTRONIC DEVICE WITH MOTION-CONTROLLED CURSOR

(75) Inventors: Fred W. Huntzicker, Ann Arbor, MI (US); Clark E. McCall, Ann Arbor, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 742 days.

(21) Appl. No.: 12/688,588

(22) Filed: Jan. 15, 2010

(65) Prior Publication Data

US 2010/0117960 A1 May 13, 2010

(51) Int. Cl.
*G06F 3/033* (2013.01)
*G09G 5/08* (2006.01)

(52) U.S. Cl.
USPC .......................................... 345/158

(58) Field of Classification Search
None
See application file for complete search history.

(56) References Cited

U.S. PATENT DOCUMENTS

| | | | | |
|---|---|---|---|---|
| 5,870,079 | A * | 2/1999 | Hennessy | 345/159 |
| 2002/0024506 | A1 * | 2/2002 | Flack et al. | 345/169 |
| 2004/0215719 | A1 * | 10/2004 | Altshuler | 709/204 |
| 2005/0149576 | A1 * | 7/2005 | Marmaros et al. | 707/200 |
| 2005/0174324 | A1 * | 8/2005 | Liberty et al. | 345/156 |
| 2005/0198220 | A1 * | 9/2005 | Wada et al. | 709/220 |
| 2006/0101005 | A1 * | 5/2006 | Yang et al. | 707/3 |
| 2006/0176294 | A1 * | 8/2006 | Vaananen | 345/419 |
| 2006/0288314 | A1 * | 12/2006 | Robertson | 715/863 |
| 2007/0057911 | A1 * | 3/2007 | Fateh | 345/156 |
| 2007/0171190 | A1 * | 7/2007 | Wang | 345/156 |
| 2007/0202914 | A1 * | 8/2007 | Maaloe | 455/550.1 |
| 2007/0216641 | A1 * | 9/2007 | Young et al. | 345/156 |
| 2008/0106523 | A1 * | 5/2008 | Conrad | 345/173 |

OTHER PUBLICATIONS

Screen shot of IE6 obtained from wikipedia on Jul. 27, 2012.*

* cited by examiner

*Primary Examiner* — Amare Mengistu
*Assistant Examiner* — Antonio Xavier

(57) ABSTRACT

A handheld electronic device of the present invention includes a display, a memory, a motion sensor, and a controller. The memory is configured for storing a viewable output of at least one software application. The controller is in communication with the display, the memory, and the motion sensor. The controller includes a first control logic that generates a first image on the display representative of a portion of the viewable output of the software application. The first image has a field of view (FOV), where the viewable output includes an inner region and an outer region. A second control logic adjusts the FOV of the first image based upon movement of the handheld device. A third control logic displays a second image of a cursor in the inner region. A fourth control logic displays the second image of the cursor in the outer region.

12 Claims, 15 Drawing Sheets

HANDHELD ELECTRONIC DEVICE WITH MOTION-CONTROLLED CURSOR

CROSS REFERENCE TO RELATED APPLICATIONS

This application claims the benefit under 35 U.S.C. 120 of U.S. patent application Ser. No. 11/853,693 filed on Sep. 11, 2007, which is hereby incorporated in its entirety herein by reference.

FIELD

The present disclosure relates to a handheld electronic device, and more particularly to a handheld electronic device having a display that generates an image and a cursor, where a field of view (FOV) of the display is controlled by movement of the handheld electronic device.

BACKGROUND

The statements in this section merely provide background information related to the present disclosure and may or may not constitute prior art.

It is becoming relatively common for handheld display devices, such as personal digital assistants (PDAs) or smartphones, to run a variety of different software applications. Some types of commonly used software applications may include an email program or an Internet browser. A generalized handheld electronic device might include a display (e.g., a liquid crystal display), an externally-mounted user input device (e.g., a group of buttons or a cursor device), and a controller for running the software applications. In operation of the device a user may utilize one of the software applications available to generate images and text on the display that represents the output of the software application. For example, if the software application is an Internet browser, the image may be a webpage.

The display in a handheld electronic device is limited in size, and is usually only a fraction of the dimensions of a display found in a personal computer. As a result, images such as webpages that are formatted for large displays as used with personal computers may not be accurately shown on the handheld device display. In some cases, some portions of the webpage may be difficult or even impossible to view on a handheld display. Consequently, the handheld display has a field of view (FOV) that displays only a portion of the image generated by the webpage. The user may then manually manipulate the FOV of the display utilizing the externally-mounted user input to view the entire image, portion by portion. For example, a user may utilize the externally-mounted user input to scroll the FOV of the image upward, downward, to the left, and to the right and to adjust the scale of the FOV (i.e., to zoom in and out) as desired.

Handheld display devices that require manual manipulation of the externally-mounted user input device to adjust the display's FOV may be limited in certain respects. For example, the externally-mounted user input device may occupy a relatively large amount of space on the device's exterior that might otherwise accommodate a larger display screen or additional user inputs. Furthermore, the manner in which such externally-mounted user input devices are utilized to manipulate the display's FOV may not be intuitive to some users.

Another known problem that occurs with handheld electronic devices is the ability to easily select an object displayed by the software application. The device may include an externally-mounted mouse that controls a cursor on the display. For example, the externally-mounted mouse could be a device such as a touchpad located under the display. However, the touchpad may be limited in size due to packaging constraints, making the touchpad difficult for some users to manipulate. In another example, the device may not have a cursor at all, and a user's finger may act as a pointer instead. However, this approach may not be intuitive to some users who may prefer a cursor that is visible on the display.

In view of the above, it is desirable to provide a handheld electronic device that includes a means for manipulating a cursor on a display that is intuitive and that overcomes the disadvantages described above.

SUMMARY

The present invention provides a handheld electronic device having a display, a memory, a motion sensor and a controller. The memory is configured for storing a viewable output of at least one software application. The motion sensor is configured to monitor movement of the handheld electronic device. The controller is in communication with the display, the memory, and the motion sensor.

The controller includes: a first control logic, a second control logic, a third control logic and a fourth control logic. The first control logic generates a first image on the display representative of a portion of the viewable output of the software application, where the image has a field of view (FOV). The viewable output includes an inner region and an outer region, where the inner region is surrounded at least in part by the outer region. The second control logic adjusts the FOV of the image based upon movement of the handheld device detected by the motion sensor. The third control logic displays a second image of a cursor in the inner region when the inner region is within the FOV of the first image. The fourth control logic displays the second image of the cursor in the outer region when a portion of the inner region and the outer region are within the FOV of the first image.

In an embodiment of the present invention the cursor is located in a first position in the inner region, and is located in a second position in the outer region.

In another embodiment of the present invention the second position is located on an outer periphery of the viewable output.

In yet another embodiment of the present invention the outer periphery of the viewable output includes at least one selectable object that is selected by the cursor.

In an embodiment of the present invention the cursor is continuously displayed on the image as the FOV of the image is adjusted.

In another embodiment of the present invention the motion sensor an accelerometer, an infrared sensor, or an optical sensor.

In yet another embodiment of the present invention the motion sensor is configured to monitor the movement of the handheld electronic device within a first plane.

In an embodiment of the present invention the controller is configured to scroll the FOV based upon the movement of the handheld electronic device within the first plane.

In another embodiment of the present invention the controller is configured to adjust the scale of the FOV based upon the movement of the handheld electronic device within the first plane.

In yet another embodiment of the present invention the motion sensor is further configured to monitor the movement of the handheld electronic device along an axis substantially perpendicular to the first plane.

In an embodiment of the present invention the controller is configured to adjust the scale of the FOV based upon the movement of the handheld electronic device along the axis.

In another embodiment of the present invention the cursor remains substantially stationary when the FOV of the first image is adjusted and includes only the inner region.

In yet another embodiment of the present invention, a handheld electronic device having a display, a memory, a motion sensor and a controller is provided. The memory is configured for storing a viewable output of at least one software application. The motion sensor is configured to monitor movement of the handheld electronic device. The controller is in communication with the display, the memory, and the motion sensor.

The controller includes: a first control logic, a second control logic, a third control logic and a fourth control logic. The first control logic generates a first image on the display representative of a portion of the viewable output of the software application, where the image has a field of view (FOV). The viewable output includes an outer periphery, an inner region and an outer region, where the inner region is surrounded at least in part by the outer region. The outer region includes the outer periphery. The second control logic adjusts the FOV of the image based upon movement of the handheld device detected by the motion sensor. The third control logic displays a second image of a cursor in a first position in the inner region when the inner region is within the FOV of the first image. The fourth control logic displays the second image of the cursor in a second position in the outer region and on the outer periphery of the viewable output when a portion of the inner region and the outer region are within the FOV of the first image.

In an embodiment of the present invention the outer periphery of the viewable output includes at least one selectable object that is selected by the cursor.

In another embodiment of the present invention the motion sensor is configured to monitor the movement of the handheld electronic device within a first plane.

In yet another embodiment of the present invention the cursor remains substantially stationary when the FOV of the first image is adjusted and includes only the inner region.

In an embodiment of the present invention, a method of displaying a software application on a handheld device is provided. The method includes the step of generating a first image representative of a portion of a viewable output created by the software application on a display of the handheld electronic device. The first image has a field of view (FOV), where the viewable output includes an inner region and an outer region, and the inner region is surrounded at least in part by the outer region. The method further comprises the step of adjusting the FOV of the first image based upon data indicating movement of the handheld device. The method further comprises the step of generating a second image of a cursor on the display, where the second image of the cursor is in the inner region when the inner region is within the FOV of the first image. The second image of the cursor is in the outer region when a portion of the inner region and the outer region are within the FOV of the first image.

In another embodiment of the present invention the method further comprises the step of monitoring the movement of the handheld device by the motion sensor.

In yet another embodiment of the present invention the method further comprises the step of monitoring the movement of the handheld device within a first plane.

In an embodiment of the present invention the method further comprises the step of monitoring the movement of the handheld device along an axis substantially perpendicular to the first plane.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
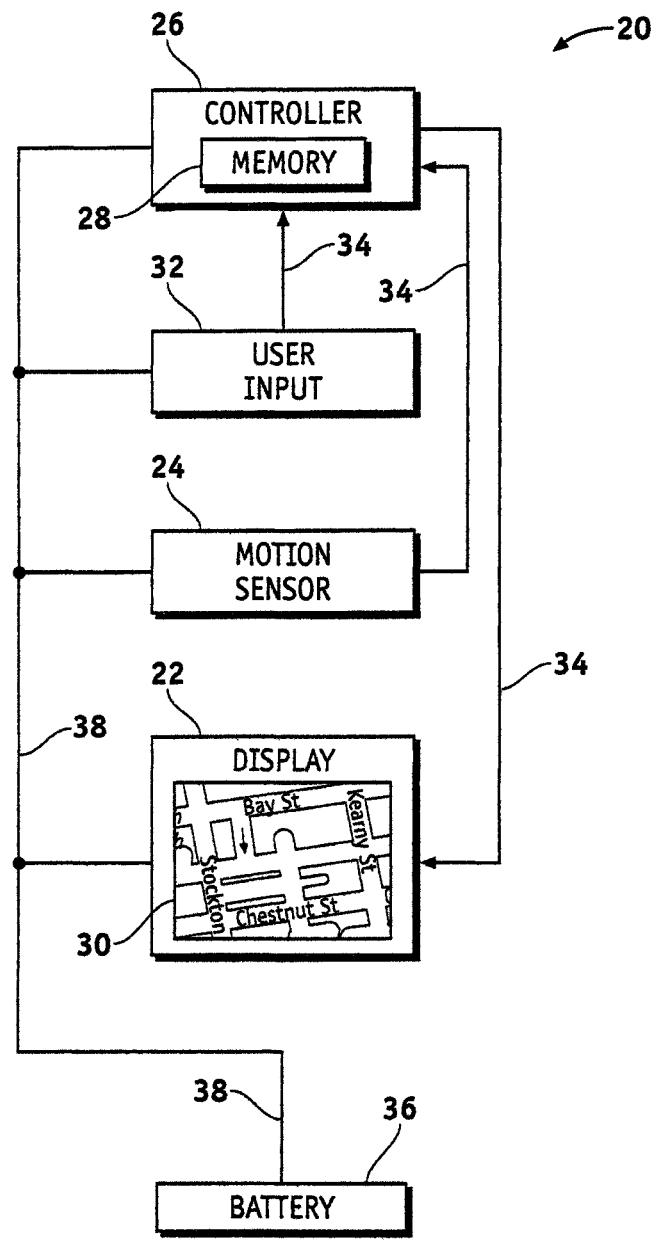
FIG. 1 is a block diagram of a keyfob having a motion-controlled display in accordance with a first exemplary embodiment.

FIG. 1 is block diagram of an exemplary handheld electronic device 20 including a motion-controlled display 22 (e.g., a liquid crystal display). In addition to display 22, handheld electronic device 20 comprises at least one motion sensor 24 and a controller 26 having a memory 28 associated therewith. As will be described in more detail below, memory 28 stores data relating to at least one map that may be displayed, in portions, on display 22 (shown in FIG. 1 at 30). If desired, handheld electronic device 20 may also include at least one user input 32, which may take the form of a group of buttons, a cursor device, a touchpad, or the like. A plurality of communications lines 34 operatively couple controller 26 to the other components of handheld electronic device 20. Power may be supplied by way of battery 36, which is coupled to each component of electronic device 20 via connections 38.

Controller 26 may comprise any processing device suitable for performing the various methods, process, tasks, calculations, and display functions described herein below. In this respect, central controller 26 may comprise (or be associated with) any number of individual microprocessors, navigational equipment, memories, power supplies, storage devices, interface cards, and other standard components known in the art. Furthermore, controller 26 may include or cooperate with any number of software programs (e.g., cartographic map display programs) or instructions.

Motion sensor 24 comprises any device suitable for measuring the movement of handheld electronic device 20, including, for example, various gyroscopes and accelerometers. In a one embodiment, motion sensor 24 takes the form of at least one accelerometer; e.g., a strain gauged based accelerometer that detects the deflection of a seismic mass using a silicon or foil strain gauged element.

Handheld electronic device 20 may assume a variety of different forms, including, but not limited to, a mobile phone, a digital watch, a digital audio file player (e.g. an MP3 or MP4 player), or a personal digital assistant (PDA). This notwithstanding, display device 20 takes the form of a keyfob, such as that described below in conjunction with FIG. 2. When assuming the form of a keyfob, display device 20 may include one or more additional components beyond those shown in FIG. 1; e.g., a wireless transmitter suitable for transmitting radiofrequency signals to a vehicle indicative of user commands (e.g., UNLOCK DOORS, LOCK DOORS, POP TRUNK, etc.). Such components are standard in the industry and are thus not described in detail herein.

Figure 2:
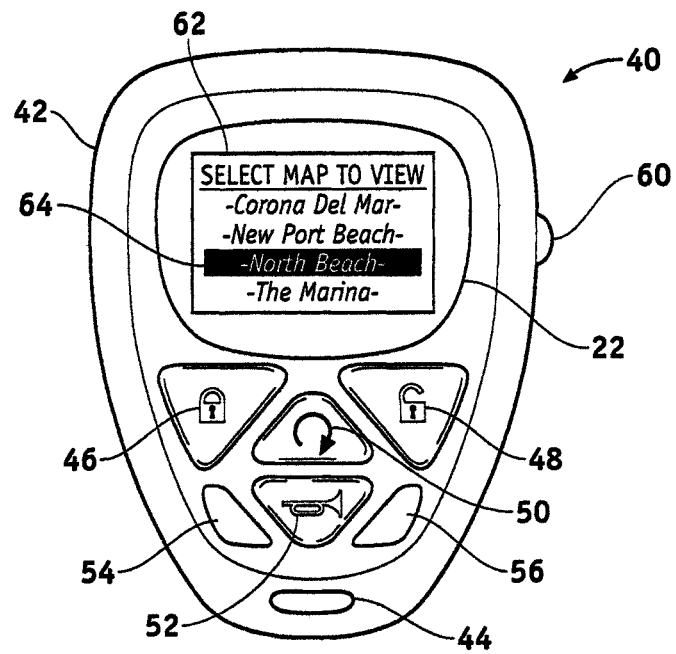
FIGS. 2 and 3 are plan views of the keyfob shown in FIG. 1 displaying an exemplary graphical menu structure and map view, respectively.
Figure 3:
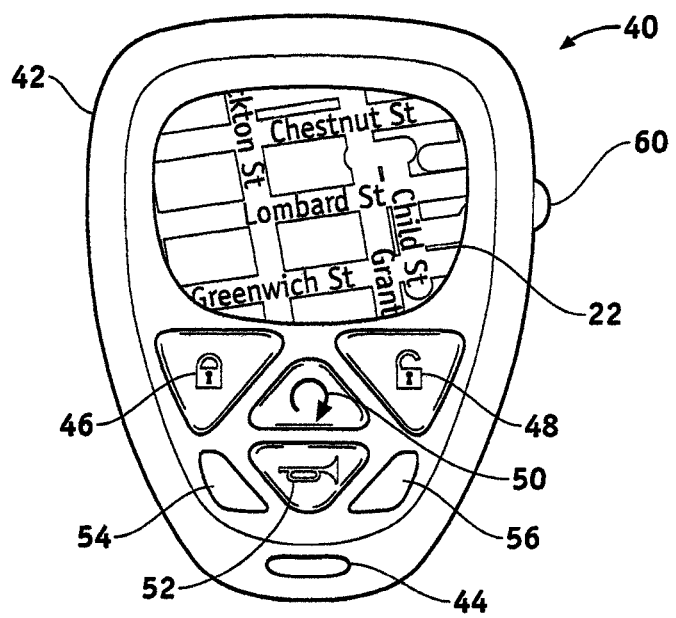

FIGS. 2 and 3 are plan views of a keyfob 40 corresponding to electronic device 20 (FIG. 1). Keyfob 40 comprises a housing 42 having an opening 44 therethrough that enables keyfob 40 to be attached to a keychain in the well known manner. In this case, user input 32 (FIG. 1) comprises a plurality of buttons mounted on the exterior of housing 42. This plurality of buttons may include a LOCK button 46, an UNLOCK button 48, a REMOTE START button 50, a TRUNK UNLOCK button 52, a MOTION CONTROL button 54, and a DISPLAY MAP button 56 (the functions of the latter two buttons will be described below). A scroll wheel 60 may be mounted on a side of housing 42 and utilized to navigate among status information pertaining to the vehicle and displayed on display 22 (e.g., information relating to the vehicle's mileage, tire pressure, current fuel level, radio station settings, door lock status, etc.). A user may rotate scroll wheel 60 to navigate between vehicular features and depress scroll wheel 60 to select a desired feature and view the status information associated therewith.

As noted above, keyfob 20 includes a memory (e.g., memory 28 shown in FIG. 1) suitable for storing data relating to one or more maps. As indicated in FIG. 2, a user may select a desired map from a library of stored maps utilizing a selection menu 62, which may be accessed utilizing DISPLAY MAP button 56. Selection menu 62 may contain a list of text labels representing different maps stored in memory 28. A user may select amongst this list of text labels by, for example, rotating scroll wheel 60 until a text label designating a desired map is highlighted (indicated in FIG. 2 at 64). The user may then depress scroll wheel 60 to select the desired map. As indicated in FIG. 3, controller 26 subsequently generates a portion of the selected map on display 22. The map may include symbology indicative of various types of cartographic information, including the locations of buildings, roadways, and other geographic features. In addition, if keyfob 20 is equipped with a global positioning system (GPS) device or other such position-locating device, the generated map may indicate the position of keyfob 20. This example notwithstanding, it should be appreciated that the manner in which a particular map is selected or recalled will inevitably vary in different embodiments. For example, in certain embodiments, controller 26 may recall a map without undergoing a user-selection process; e.g., if keyfob 20 is equipped with a GPS device or other such position-locating device, controller 26 (FIG. 1) may determine the appropriate map to recall from memory 28 based upon the current location of keyfob 20.

Figure 4:
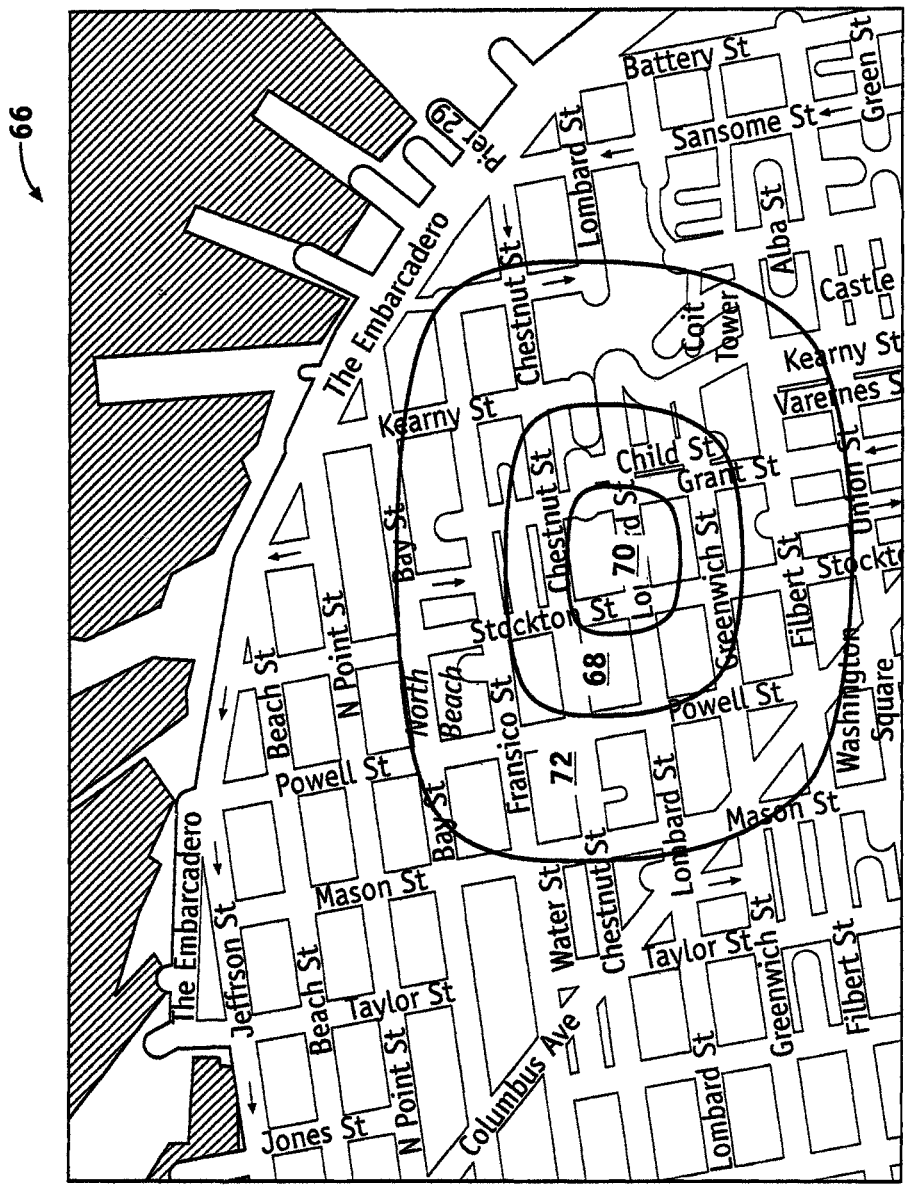
FIG. 4 is a map that may be displayed, in portions, on the display of the keyfob shown in FIGS. 2 and 3 illustrating three field of views (FOVs) each having a different scale.
Figure 5:
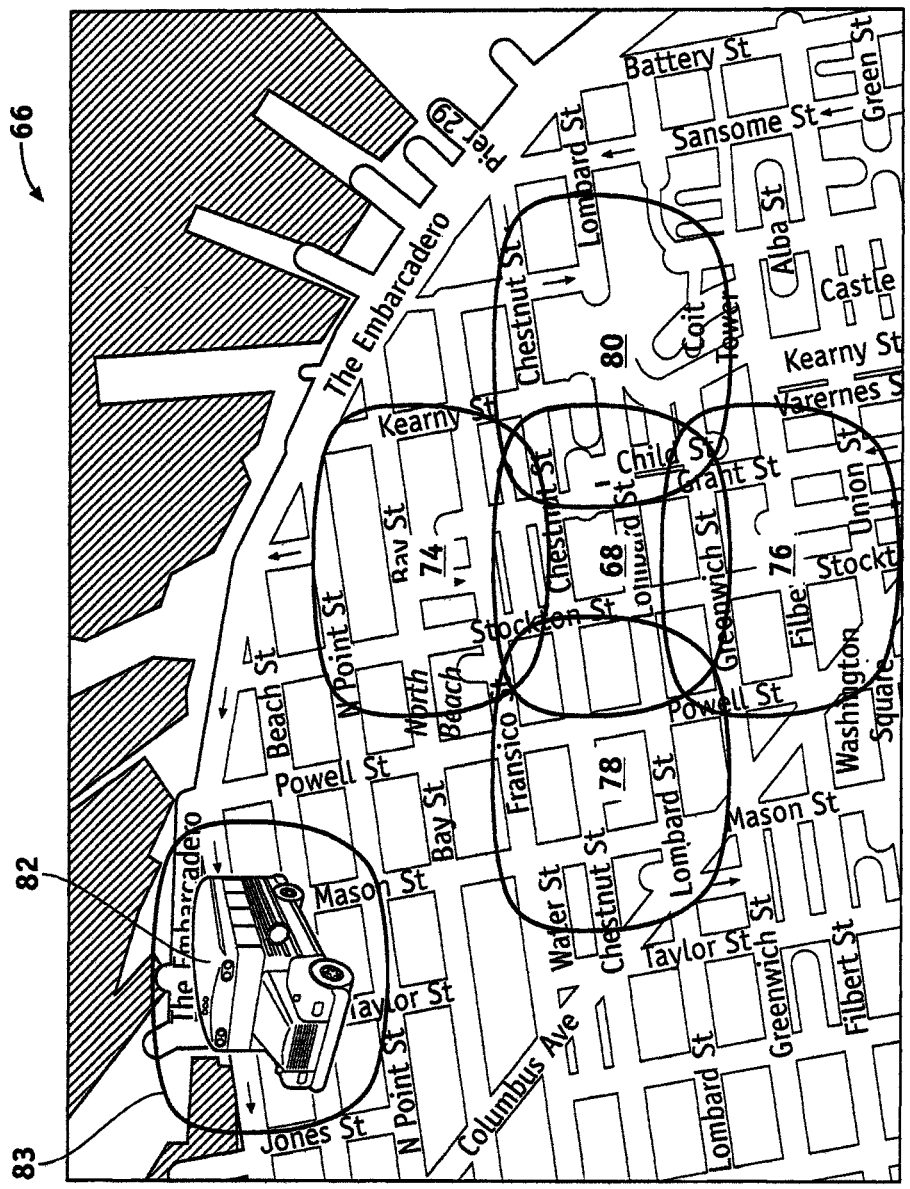
FIG. 5 is a map that may be displayed, in portions, on the display of the keyfob shown in FIGS. 2 and 3 illustrating five FOVs having the same scale.

FIGS. 4 and 5 each illustrate a map 66 that may be stored in memory 28 and displayed, in portions, on display 22. When produced on display 22, a displayed map portion will have a particular field of view (FOV) associated therewith. As only a portion of map 66 is shown at a given time, the area displayed within the FOV will generally be less than the total area of map 66. However, the area displayed within the FOV may be varied by adjusting the scale (i.e., zooming in or out) in the well known manner. For example, as indicated in FIG. 4, the area shown in an initial FOV 68 may be decreased by zooming in to a second FOV 70 or, instead, increased by zooming out to a third FOV 72. The area shown in the FOV may also change as the keyfob 20 moves within a plane that may be substantially parallel to the plane of map 66 (commonly referred to as "scrolling"). That is, as indicated in FIG. 5, the area shown in initial FOV 68 may be adjusted by scrolling upward to a fourth FOV 74, scrolling downward to a fifth FOV 76, scrolling left to a sixth FOV 78, or scrolling right to a seventh FOV 80.

By adjusting the FOV of the displayed map portion in the manner described above, a user may explore map 66, locate a desired destination, or determine a route of travel. Controller 26 may also be configured to generate icons on display 22 indicative of the locations of points-of-interest (e.g., automated teller machines) on map 66. If desired, such icons may initially be enlarged to facilitate user-location. For example, as shown in FIG. 5, a bus icon 82 designating the general location of a bus stop may be enlarged to increase the probability that a user will come across a portion of icon 82 as he or she adjusts the FOV of the map image to explore map 66. Furthermore, when a user then centers the FOV on bus icon 82 (indicated in FIG. 5 at 83), controller 26 may scale bus icon 82 down so as to reveal the portion of map 66 surrounding the bus stop represented by bus icon 82.

In conventional electronic devices, an externally-mounted user input, such as a cursor device, is typically employed to adjust the FOV of the displayed map portion (e.g., scrolling and zooming). However, as noted above, such externally-mounted user inputs are associated with certain limitations. Thus, in accordance with an exemplary embodiment of the present invention, the following describes different manners in which controller 26 may be configured to adjust the FOV of display 22 in relation to the movement of keyfob 40 (FIG. 2) as detected by motion sensor 24.

Figure 6:
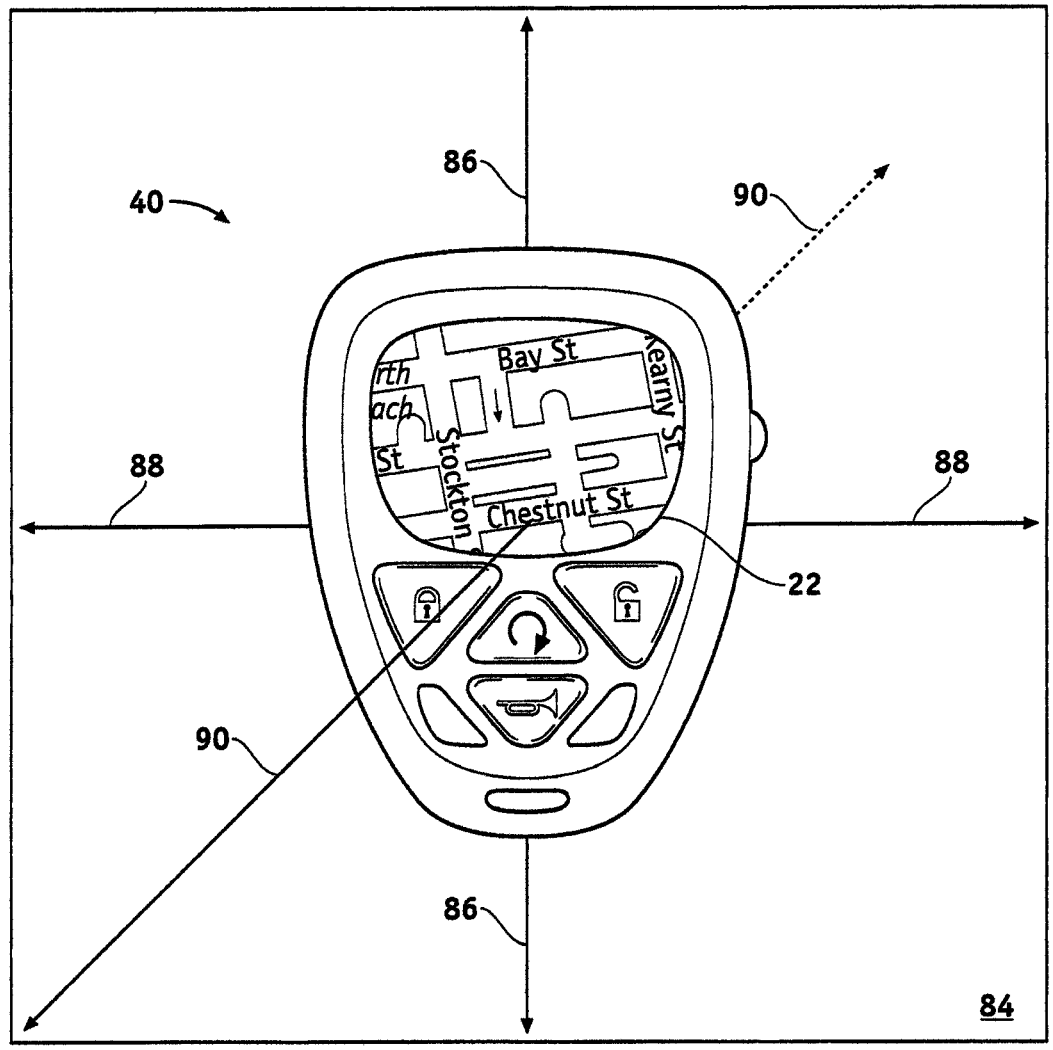
FIG. 6 is an isometric view of the keyfob shown in FIGS. 2 and 3 illustrating a first set of motions that may be utilized to transition between the FOVs shown in FIGS. 4 and 5.

FIG. 6 illustrates a first exemplary manner in which controller 26 may be configured to adjust the FOV of display 22 based upon the movement of keyfob 40 as detected by motion sensor 24. In this particular exemplary embodiment, motion sensor 24 (FIG. 1) of keyfob 40 is configured to measure the movement of keyfob 40 within a first plane 84; i.e., along a longitudinal axis 86 and a first transverse axis 88. If desired, motion sensor 24 may also be configured to measure the movement of keyfob along a second traverse axis 90. Plane 84 may be substantially perpendicular (or parallel) to ground, and second transverse axis 90 may be substantially perpendicular to plane 84; however, it will be appreciated that the orientation of plane 84 and second transverse axis 90 with respect to each other and with respect to ground may vary amongst different embodiments.

In accordance with exemplary embodiment illustrated in FIG. 6, controller 26 (FIG. 1) may adjust the FOV of display 22 (FIG. 2) based upon device movement in the following manner: when motion sensor 24 indicates that keyfob 40 is being moved along longitudinal axis 86 in a first direction (upward in the context of FIG. 6), controller 26 scrolls the FOV of display 22 upward. When motion sensor 24 detects that keyfob 40 is being moved along longitudinal axis 86 in a second opposite direction (downward in the context of FIG. 6), controller 26 scrolls the FOV of display 22 downward. When motion sensor 24 detects that keyfob 40 is being moved along first transverse axis 88 in a first direction (left in the context of FIG. 6), controller 26 scrolls the FOV of display 22 to the left. Finally, when motion sensor 24 indicates that keyfob 40 is being moved along first transverse axis 88 in a second opposite direction (right in the context of FIG. 6), controller 26 scrolls the FOV of display 22 to the right. Thus, referring to map 66 shown in FIG. 5, a user may scroll from FOV 68 to FOV 74, FOV 76, FOV 78, or FOV 80 by moving keyfob 40 upward, downward, to the left, or to the right, respectively.

Controller 26 may also be configured to adjust the scale of the FOV produced on display 22 based upon the movement of keyfob 40 along second transverse axis 90. For example, when motion sensor 24 indicates that keyfob 40 is being moved along second transverse axis 90 in a first direction (toward the viewer in the context of FIG. 6), controller 26 decreases the scale the FOV of display 22 (i.e., zooms out). In contrast, when motion sensor 24 detects that keyfob 40 is being moved along second transverse axis 90 in a second opposite direction (away from the viewer in the context of FIG. 6), controller 26 increases the scale the FOV of display 22 (i.e., zooms in). Thus, referring to map 66 shown in FIG. 4, a user may transition from FOV 68 to FOV 72 or FOV 70 by moving keyfob 40 generally toward or away from the user's body, respectively.

Keyfob 40 has thus been described as being configured such that the FOV of display 22 is altered based upon the movement of keyfob 40 along one or more axes. It may be appreciated that, when keyfob 40 is configured in this manner, a user may eventually reach a limit in his or her range of motion and consequently become unable to move keyfob 40 any further in a particular direction. This may make adjusting the FOV of display 22 more difficult. To address this issue, keyfob 40 may be provided with a user input that, when activated, turns on or turns off the motion-control of display 22. For example, as indicated in FIG. 2, keyfob 40 may include a MOTION CONTROL button 54 that, when depressed, deactivates the motion-control of display 22. Thus, when a user has moved keyfob 40 has, for example, moved keyfob 40 as far away from the user's body as possible, the user may depress MOTION CONTROL button 54 and bring keyfob 40 toward his or her body without adjusting the FOV of display 22. Alternatively, controller 26 maybe configured to adjust the FOV of display 22 in relation to the movement sensed by motion sensor 24 only when MOTION CONTROL button 54 is depressed.

Figure 7:
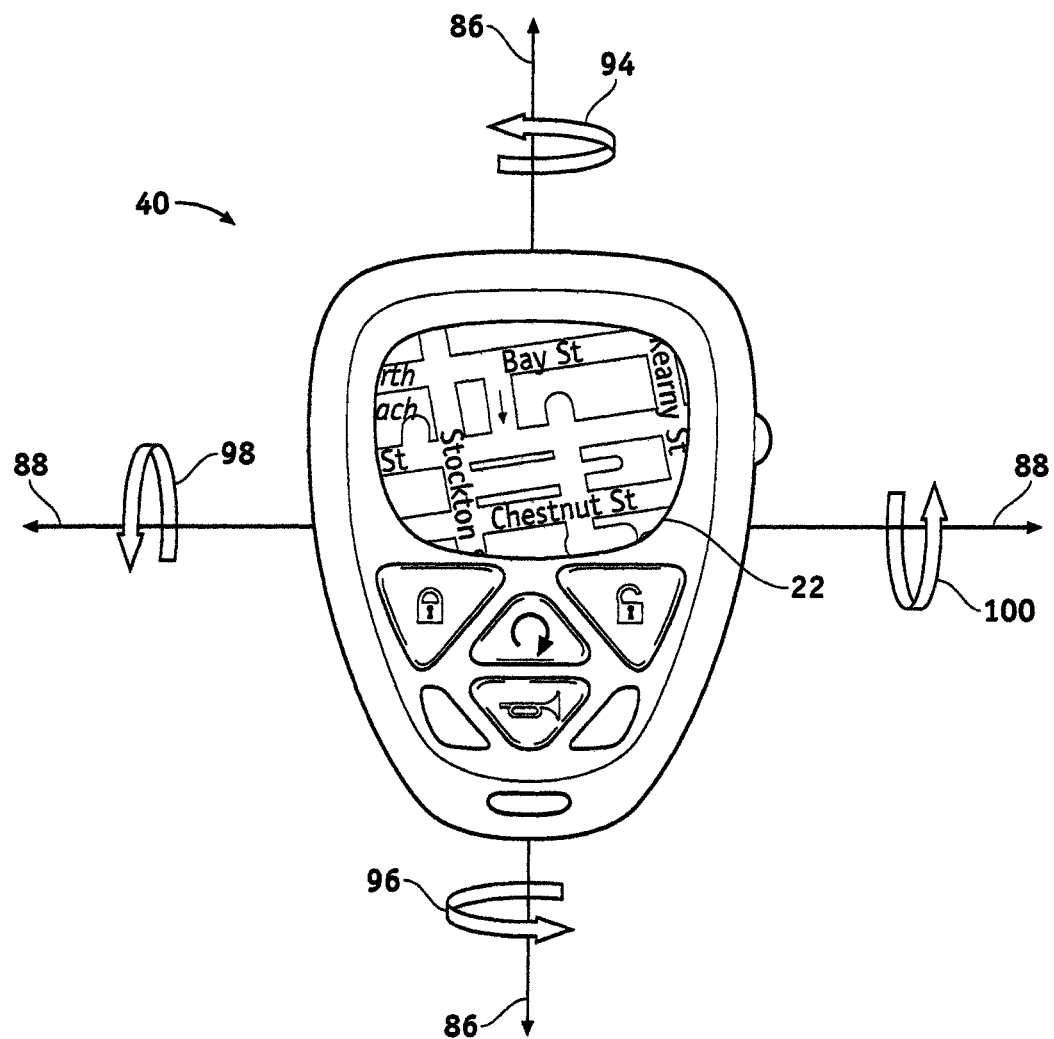
FIG. 7 is an isometric view of the keyfob shown in FIGS. 2 and 3 illustrating a second set of motions that may be utilized to transition between the FOVs shown in FIG. 5.

FIG. 7 illustrates a second exemplary manner in which controller 26 may be configured to adjust the FOV of display 22 based upon the movement of keyfob 40, which eliminates the above-noted concerns regarding a user's limited range of motion. In this exemplary case, motion sensor 24 is configured to monitor the rotation movement of keyfob 40 about one or more axes. For example, motion sensor 24 may monitor the rotation of keyfob 40 along longitudinal and transverse axes 86 and 88, respectively. Although, in the illustrated exemplary embodiment, axes 86 and 88 are perpendicular, it should be appreciated that the relative orientation of the axes (or single axis) may be varied as desired.

In the exemplary embodiment illustrated in FIG. 7, controller 26 (FIG. 1) is configured to adjust the FOV of display 22 (FIG. 2) in relation to the movement detected by motion sensor 24 in the following manner: when motion sensor 24 detects that keyfob 40 has been rotated about longitudinal axis 86 in a first direction (indicated by arrow 94), controller 26 may scroll the FOV of display 22 to the right. Thus, referring to FIG. 5, display 22 may transition from FOV 68 to FOV 80. When motion sensor 24 indicates keyfob has been rotated about axis 86 in a second opposite direction (indicated by arrow 96), controller 26 may scroll the FOV of display 22 to the left. Thus, again referring to FIG. 5, display 22 may transition from FOV 68 to FOV 78. When motion sensor 24 indicates keyfob has been rotated about traverse axis 88 in a first direction (indicated by arrow 98), controller 26 may scroll the FOV of display 22 upward. Therefore, in the context of FIG. 5, display 22 may thus transition from FOV 68 to FOV 74. Finally, when motion sensor 24 detects keyfob has been rotated about axis 88 in a second opposite direction (indicated by arrow 100), controller 26 may scroll the FOV of display 22 downward. Display 22 may thus transition from FOV 68 to FOV 76 (FIG. 5).

Motion sensor 24, in conjunction with controller 26, may also be configured to recognize motion speed and acceleration to determine the required distance and speed necessary to acquire a new FOV. That is, the speed and/or acceleration of the movement imparted to the keyfob 40 by the user may be proportional to the virtual distance to the second FOV. In addition, motion sensor 24, in conjunction with controller 26, may be configured to recognize complex motions, such as shaking and knocking. For example, when motion sensor 24 detects a shaking motion, controller 26 may revert to a default mode and clear any icons displayed on the map. In this respect, keyfob 40 may be configured to recognize other complex motions indicative of operational instructions (e.g., moving the keyfob in the shape of the letter "M" to display a map view or in the shape of the letter "S" to display a status menu). As yet another example, keyfob 40 may be configured to recognize a user-specified number by counting successive iterations of a shaking or knocking motion.

In view of the above, it should be appreciated that there has been provided a handheld portable electronic device (e.g., a PDA, a keyfob, etc.) that permits the manipulation of the FOV of a generated map image in a manner that is intuitive and that overcomes the disadvantages associated with externally-mounted controls. Although described above in conjunction with a two-dimensional planform map, it should be understood that other data may be displayed on handheld electronic device and navigated utilizing the above-described motion controls. It should also be understood that a map may be generated in accordance with other types of views, including a three-dimensional perspective view.

Figure 8:
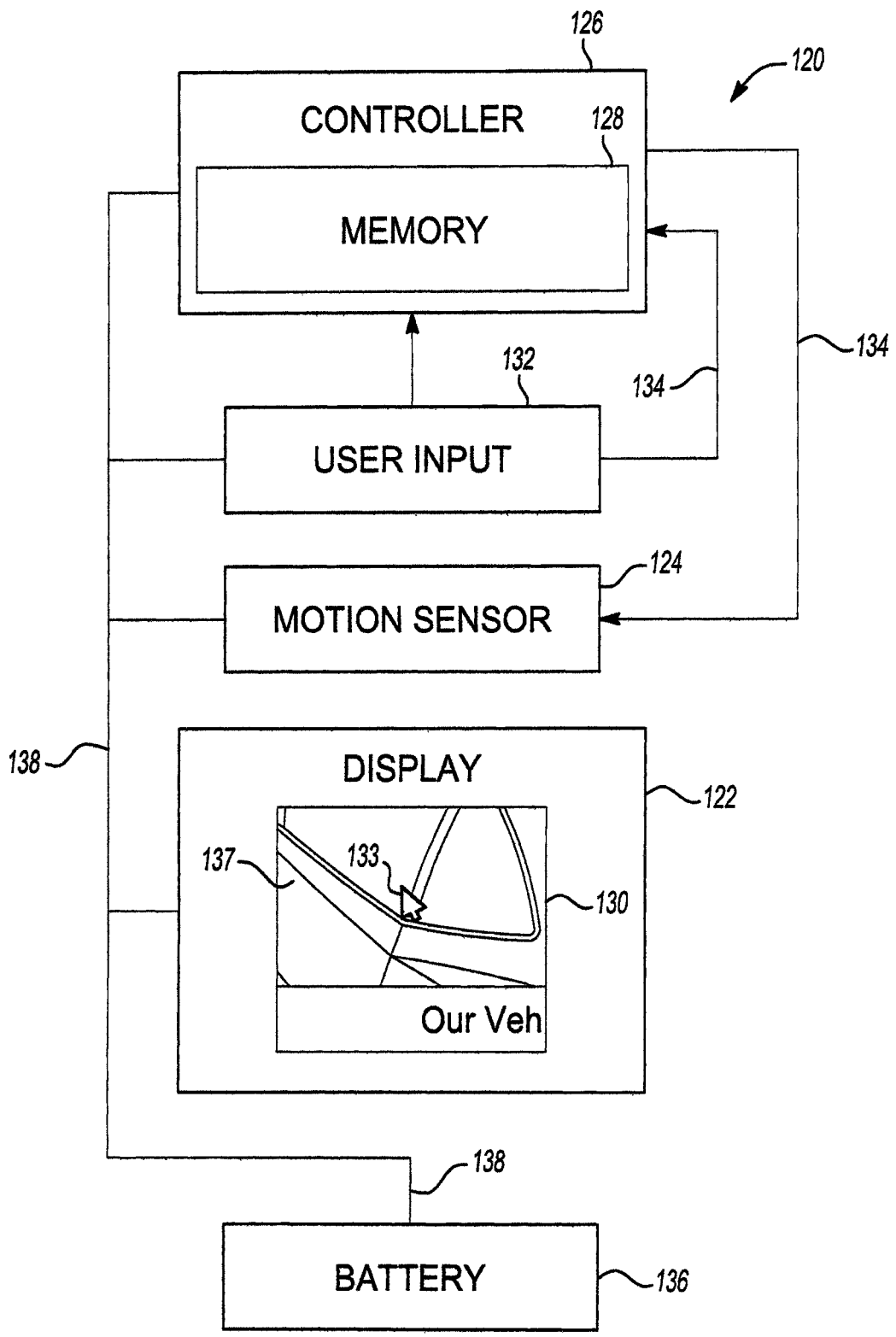
FIG. 8 is a block diagram of a smartphone having a motion-controlled display in accordance with a second exemplary embodiment.

Referring now to FIG. 8, a block diagram of a handheld electronic device according to another embodiment of the present invention is illustrated as reference number 120. Handheld electronic device 120 includes a motion-controlled display 122, at least one motion sensor 124, and a controller 126 including a memory 128. The memory 128 includes a software application and an emulator associated therewith. Controller 126 includes control logic for executing program code to initiate the software application to generate a viewable output 130 on display 122 in the form of data such as text or graphical images. As seen in FIG. 8, controller 126 generates a displayed portion 137 of viewable output 130 that is shown on the display 122.

Additionally, controller 126 includes control logic for executing program code to initiate the emulator to display a cursor 133 on display 122. Cursor 133 indicates a position on display 122. If desired, handheld electronic device 120 may also include at least one user input device 132, which may take the form of a button or a touchscreen. A plurality of communication lines 134 operatively couple controller 126 to the other components of handheld electronic device 120. Power may be supplied by way of battery 136, which is coupled to each component of electronic device 120 via connections 138.

As in the previous embodiment, controller 126 may comprise any processing device suitable for performing the various methods, process, tasks, calculations, and display functions described. In this respect, controller 126 may comprise (or be associated with) any number of individual microprocessors, memories, power supplies, storage devices, interface cards, and other standard components known in the art.

Motion sensor 124 comprises any device suitable for measuring the movement of handheld electronic device 120, including, for example, various gyroscopes, accelerometers, or various types of sensors. In one embodiment, motion sensor 124 could take on the form of an optical sensor that detects movement relative to an underlying surface, similar to the motion sensor used on an optical mouse. For example, the optical sensor may include a light-emitting diode (LED) that bounces light off the underlying surface and onto a complimentary metal-oxide semiconductor (CMOS) sensor. The CMOS sensor sends each image to a digital signal processor for analysis to determine if any significant amount of movement has occurred. Alternatively, motion sensor 124 may take the form of at least accelerometer. In one embodiment, the accelerometer may be a strain gauged based accelerometer that detects the deflection of a seismic mass using a silicon or foil strain gauged element.

In the embodiment as shown, the software application is an Internet browser. However, the software application may be any type of software program that performs a task that an end user wishes to perform, including, for example, an email program, a word processor, or a spreadsheet program. The emulator receives data regarding the position of handheld electronic device 120 from motion sensor 124. The emulator then adjusts the position of the cursor 133 on display 122 based on the position of handheld electronic device 120 as detected by motion sensor 124. Advantageously, the emulator is, for example, a software algorithm that does not require a separate controller device, such as a computer mouse, to adjust the position of cursor 133 about display 122. Alternatively, an external mouse device may be connected to handheld electronic device 120 to change the position of cursor 133 as well. For example, a Bluetooth mouse may communicate data to handheld electronic device 120 over a wireless network to adjust the position of cursor 133.

Figure 9:
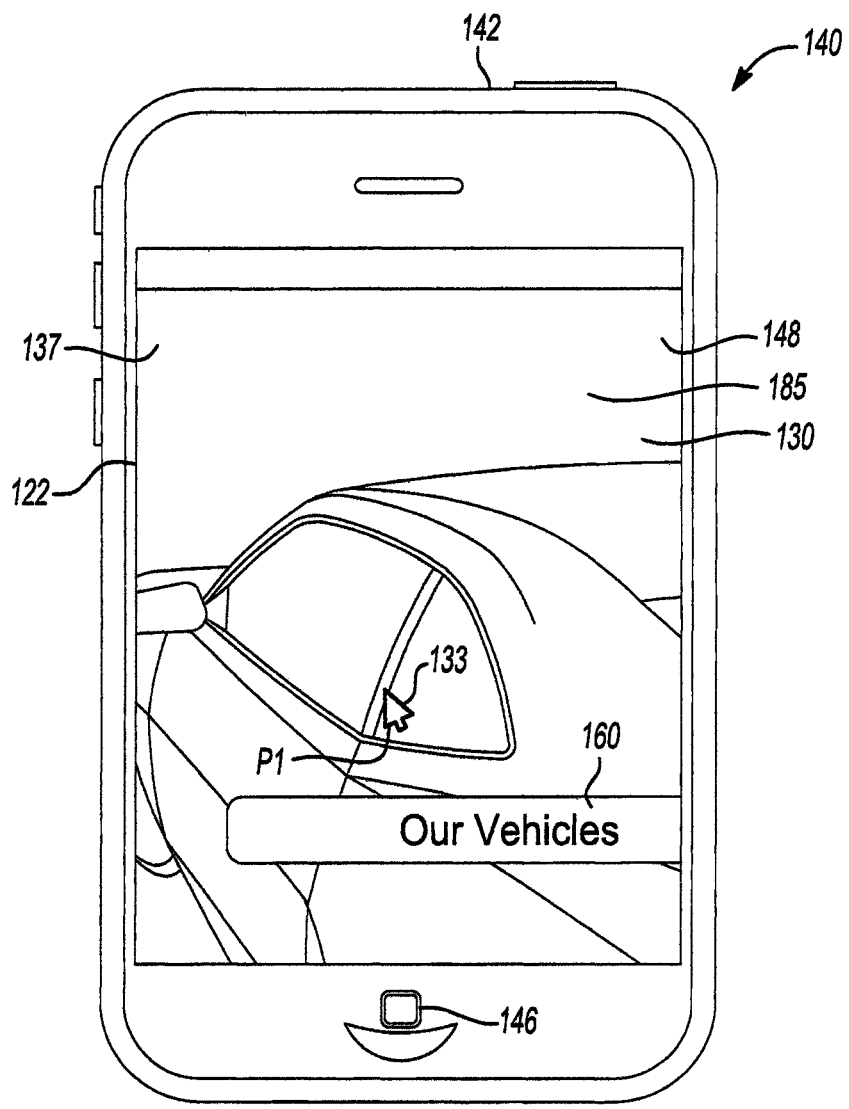
FIG. 9 is a front view of the smartphone shown in FIG. 8 displaying an exemplary graphical screen that is an Internet webpage.

Handheld electronic device 120 may assume a variety of different forms, including, but not limited to, a personal digital assistant (PDA), a keyfob, a global positioning system (GPS), portable computers such as Netbooks or Tablets, or an audio file player such as an MP3 player. In the embodiment as illustrated in FIG. 9 handheld electronic device 120 takes on the form of a smartphone 140. Smartphone 140 may be a mobile telephone including at least one software application, such as an Internet browser or an email program. When assuming the form of a smartphone, handheld electronic device 120 may include one or more additional components beyond those shown in FIG. 8, such as a wireless transmitter for transmitting cellular telephone reception signals. Such components are standard in the industry and are thus not described in detail herein.

FIG. 9 is a plan view of a smartphone 140 corresponding to electronic device 120 in FIG. 8. Smartphone 140 includes a housing 142 and at least one user input device 132 (FIG. 8). In the embodiment as shown, user input device 132 comprises a home button 146 and a touchscreen 148. Touchscreen 148 is configured to detect a user's contact on the surface of the display 122, where contact may be accomplished by a user's finger or a stylus. Although the embodiment as illustrated in FIG. 9 includes button 146 and a touchscreen 148, those skilled in the art will appreciate that smartphone 140 may include other variations of user input device 132. For example, smartphone 140 may include a plurality of buttons or softkeys that make up a typewriter keyboard.

As noted above, smartphone 140 includes the software application and the emulator. Smartphone 140 may include several different types of software applications that a user may select, such as a camera application, a telephone application or an Internet browser. In the embodiment as illustrated, an Internet browser is selected for use, where viewable output 130 is an Internet webpage. The emulator positions cursor 133 at a first position P1 on display 122. The Internet webpage may include several selectable objects, such as HTML link 160. Link 160 may be selected by placing cursor 133 over link 160 and pressing either button 146 or touchscreen 148.

As seen in FIG. 9, displayed portion 137 has a particular FOV associated therewith. The FOV represents the portion of the viewable output 130 shown on display 122. As only a portion of viewable output 130 is shown at a given time, displayed portion 137 shown on display 122 will generally be less than the total area of viewable output 130. However, the FOV shown on display 122 may be adjusted such that different portions of viewable output 130 can be displayed.

Figure 10:
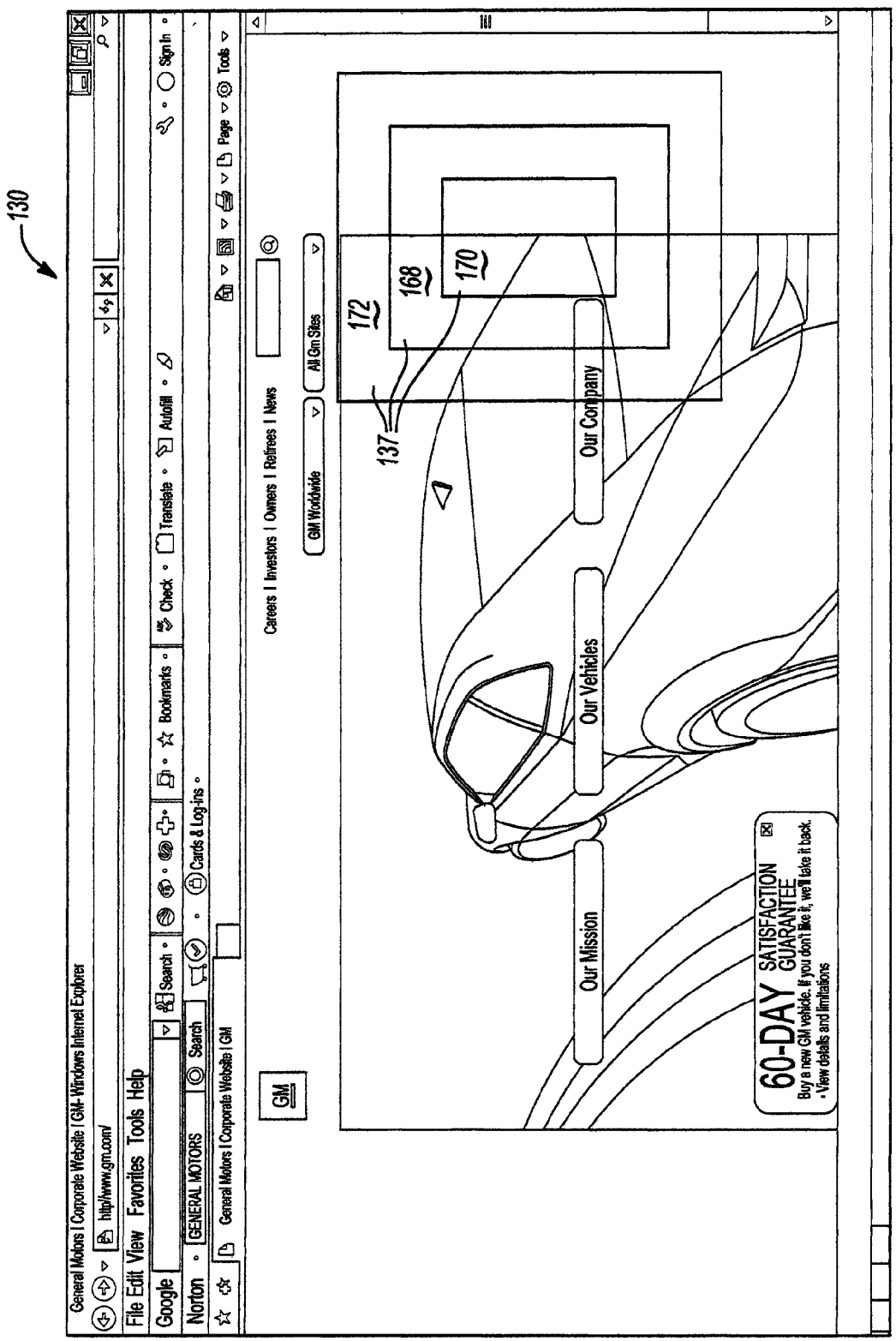
FIG. 10 is a screen that may be displayed, in portions, on the display of the smartphone shown in FIG. 9 illustrating three field of views (FOVs) each having a different scale.
Figure 11:
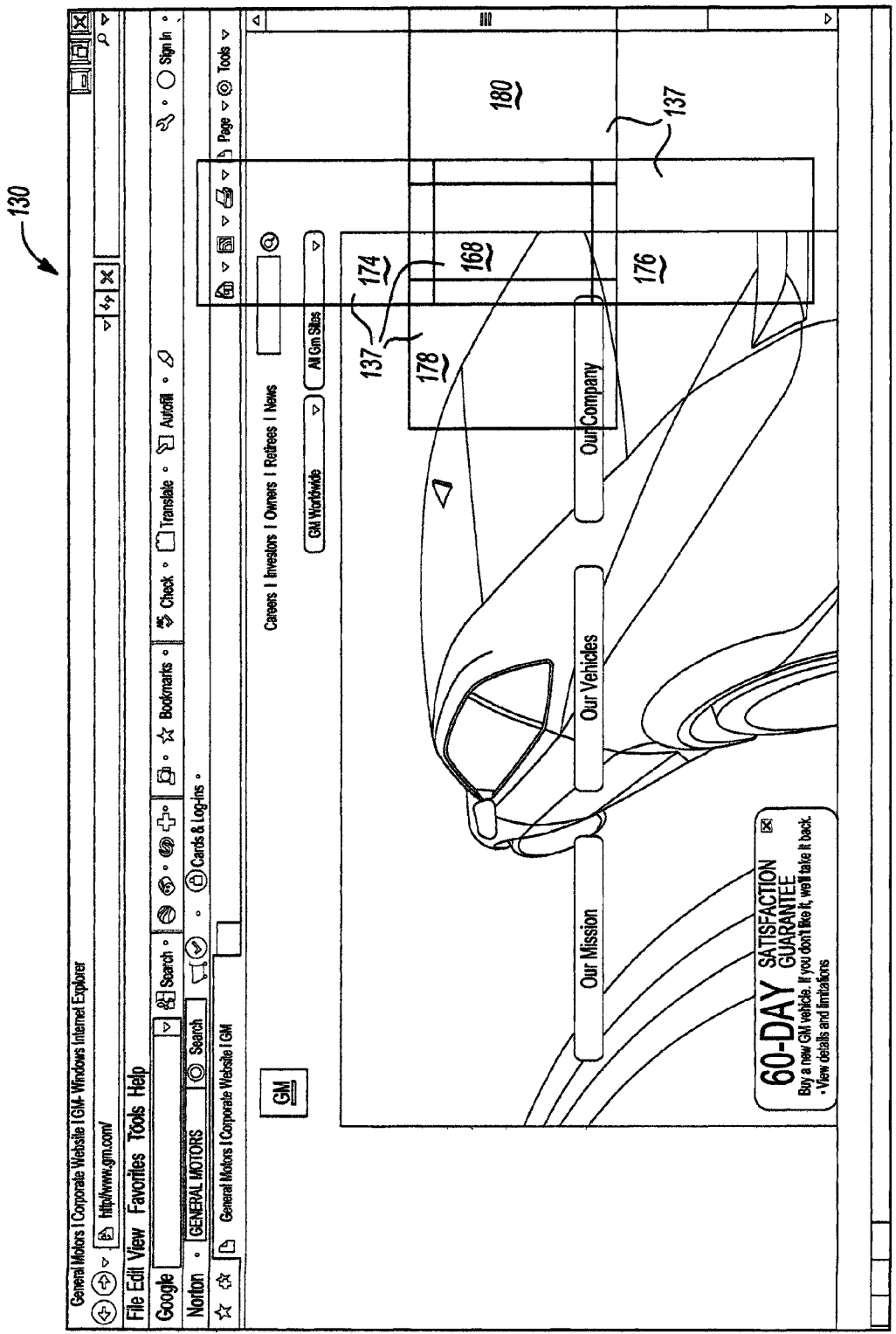
FIG. 11 is a screen that may be displayed, in portions, on the display of the smartphone shown in FIG. 9 illustrating five FOVs having the same scale.
Figure 12:
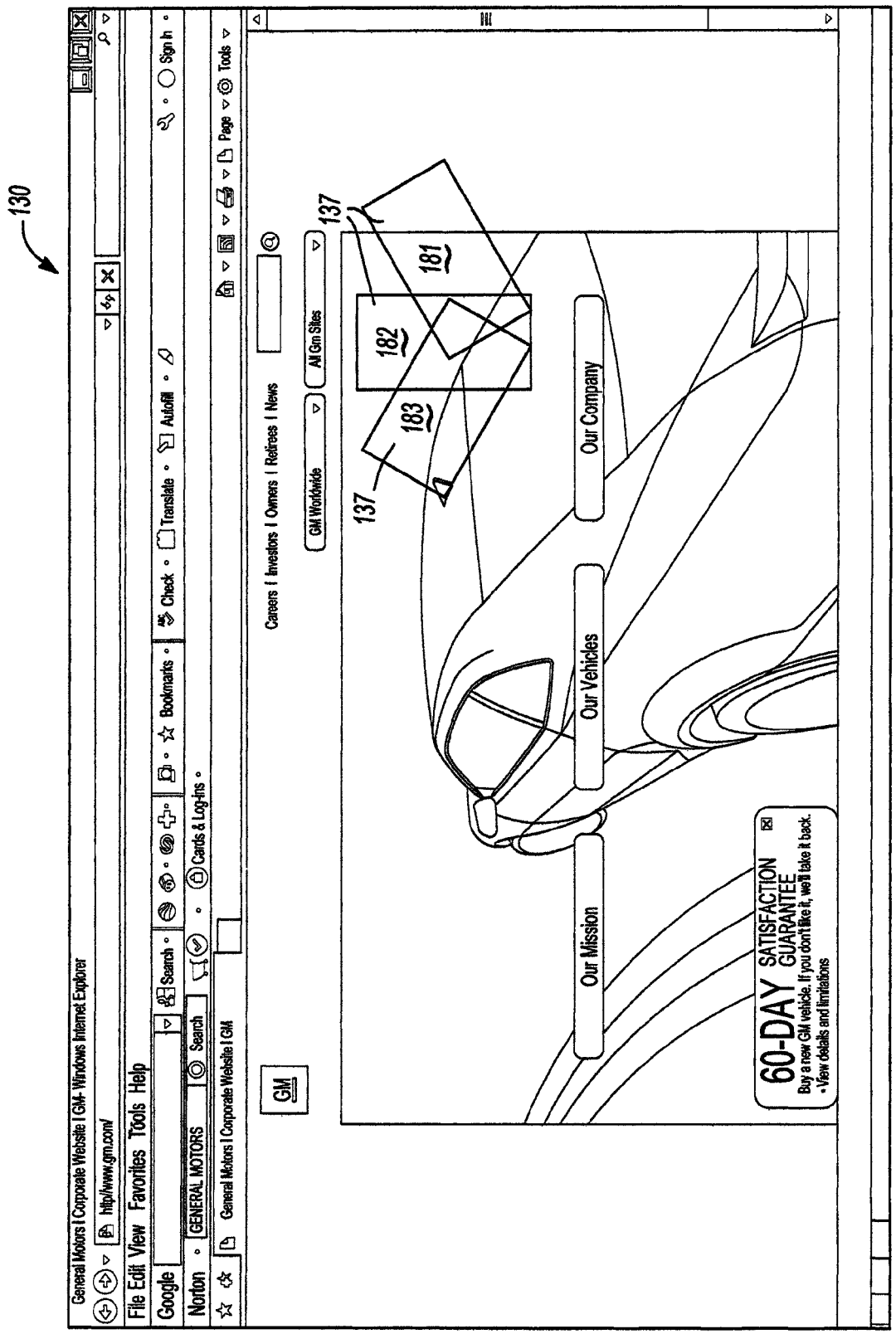
FIG. 12 is a screen that may be displayed, in portions, on the display of the smartphone shown in FIG. 9 illustrating three FOVs having the same scale.

FIGS. 10-12 each illustrate different ways a user may adjust the FOV or displayed portion 137 to view different portions of viewable output 130 on display 122. As indicated in FIG. 10, the scale the FOV of displayed portion 137 may be increased (i.e., zooms in) or decreased (i.e., zooms out). For example, an initial FOV 168 is decreased by zooming in to a second FOV 170 or, instead, increased by zooming out to a third FOV 172. Turning now to FIG. 11, the portion of viewable output 130 shown on display 122 also changes as the FOV is scrolled about the viewable output 130. For example, an initial FOV 168 is adjusted by scrolling upward to a fourth FOV 174, scrolling downward to a fifth FOV 176, scrolling left to a sixth FOV 178, or scrolling right to a seventh FOV 180. As indicated in FIG. 12, the FOV may also rotate about viewable output 130, where the initial FOV 182 is adjusted by turning the FOV about sixty degrees to the right to an eighth FOV 181, or turning the FOV about sixty degrees to the left to a ninth FOV 183. Although the embodiment as shown illustrates the FOV being rotated by about ninety degrees, one skilled in the art will appreciate that the FOV may be rotated at any desired angle as well. By adjusting the FOV in the manner described above, different portions of viewable output 130 are shown on display 122.

Figure 13:
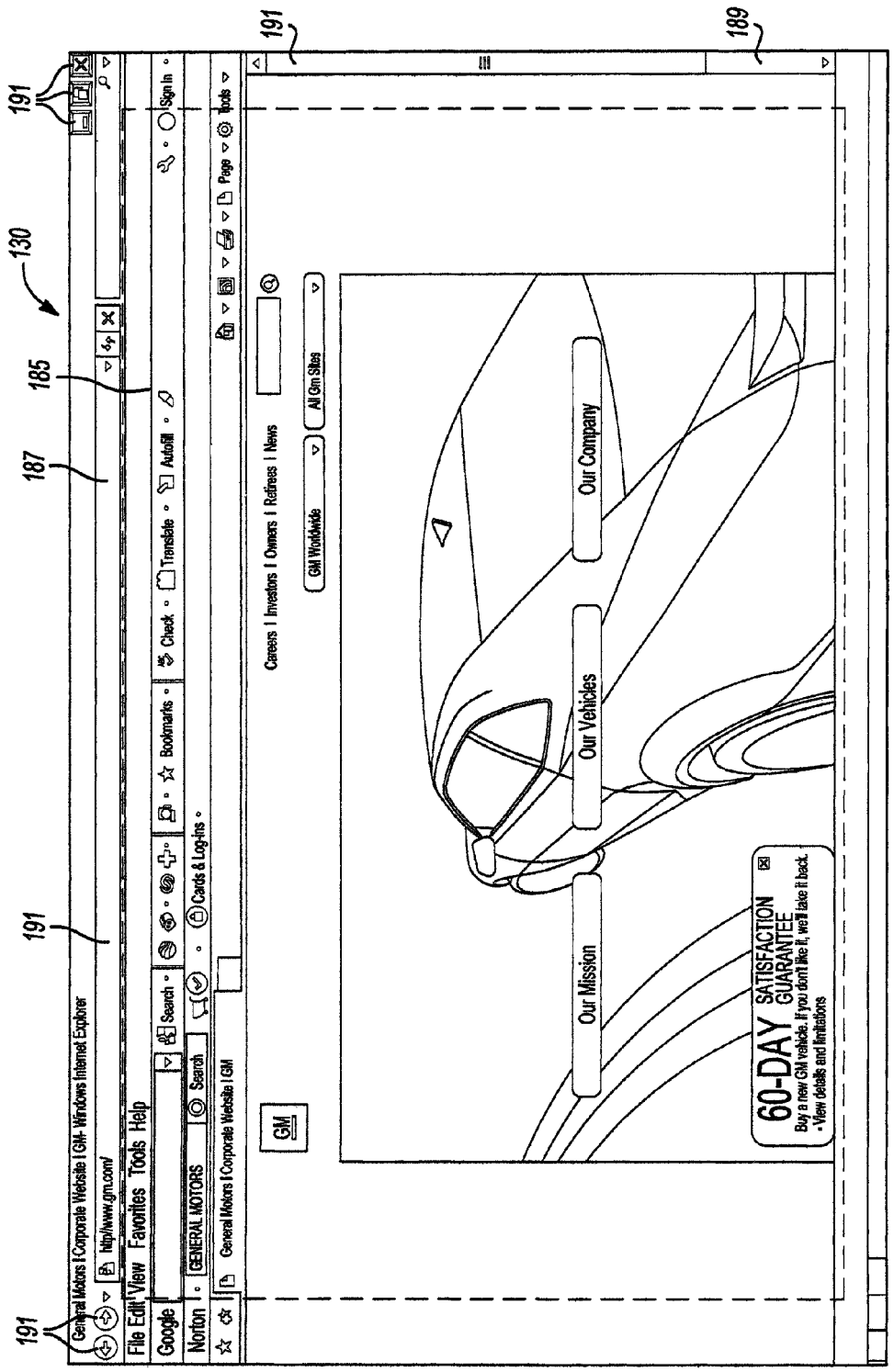
FIG. 13 is a screen that may be displayed, in portions, on the display of the smartphone illustrating an inner region and an outer region of the screen.

Turning now to FIG. 13, viewable output 130 is shown including an inner region 185 and an outer region 187. In the embodiment as shown, outer region 187 is positioned around at least a portion of an outer periphery 189 of viewable output 130 such that inner region 185 is at least partially surrounded by outer region 187. Outer region 187 may include at least one selectable object 191 located outside of inner region 185. For example, selectable object 191 may be a scrollbar located along outer periphery 189. In the embodiment as shown, several selectable objects 191 are located within outer region 187, such as a scrollbar, a drop-down menu, and a plurality of icons that are typically associated with an Internet webpage. Those skilled in the art will appreciate that outer region 187 of viewable output 130 may include other variations of selectable objects 191 as well.

Referring back to FIG. 9, as the FOV of displayed portion 137 is adjusted, cursor 133 remains positioned in first position P1 when located within inner region 185. The appearance of cursor 133, such as the size, shape and orientation, may also remain constant as the FOV of displayed portion 137 is adjusted. In the embodiment as illustrated in FIG. 9, cursor 133 is continuously displayed on display 122 as the FOV of displayed portion 137 is adjusted within inner region 185. An object in viewable output 130, such as link 160, may be selected by adjusting the FOV of displayed portion 137 such that the link 160 is positioned under cursor 133, and selected by pressing either button 146 or touchscreen 148.

Figure 14:
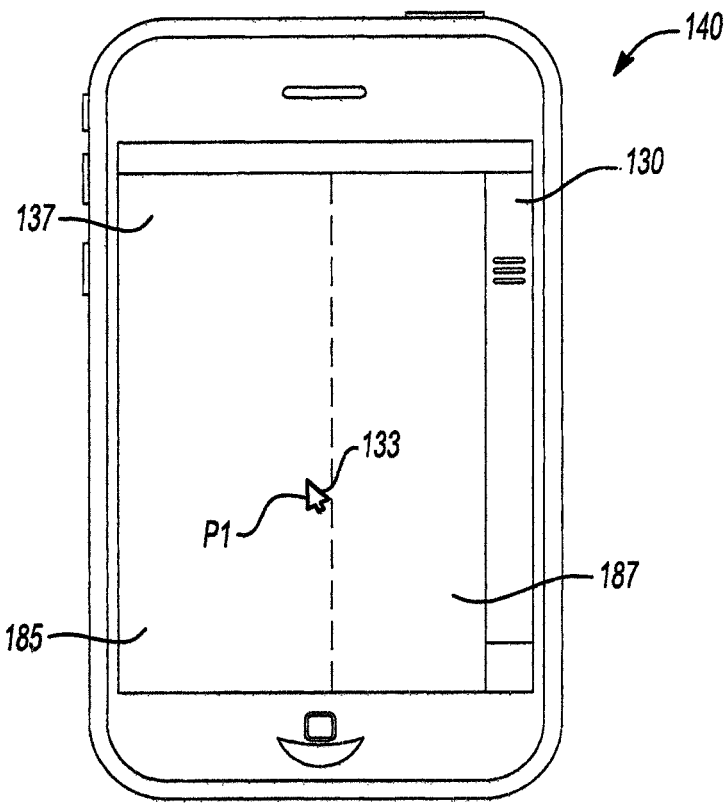
FIG. 14 is a plan view of the smartphone where a cursor is located in the inner region of the screen.
Figure 15:
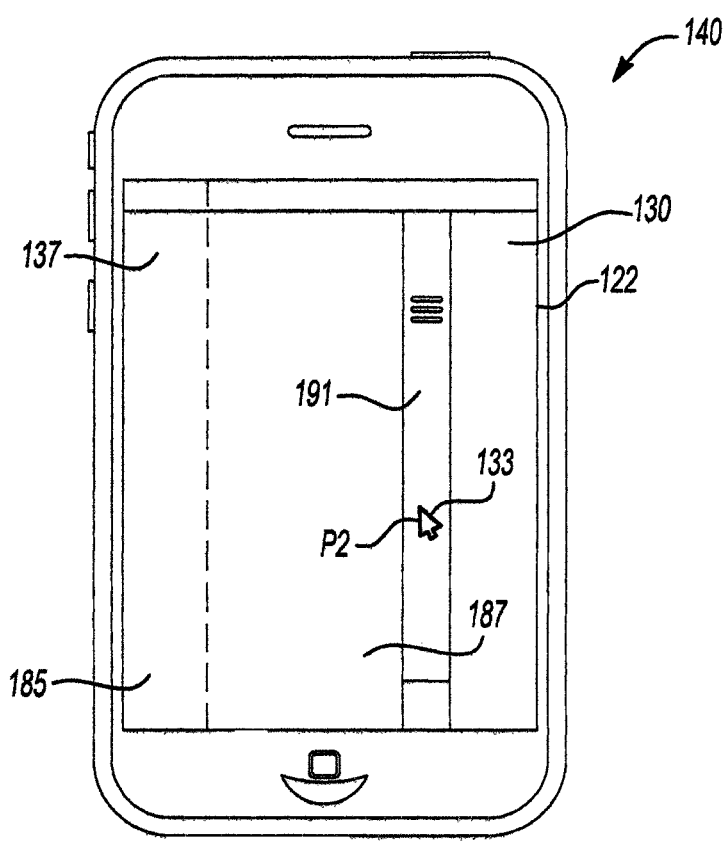
FIG. 15 is a plan view of the smartphone where the cursor is located in the outer region of the screen.

The position of cursor 133 may be adjusted from first position P1 to a second position P2 as FOV approaches outer region 187. FIGS. 14 and 15 each illustrate display 122 as the FOV approaches outer region 187 of viewable output 130. FIG. 14 illustrates the FOV of displayed portion 137 just before cursor 133 enters outer region 187, where cursor 133 is still located within inner region 185. In the illustrations of FIGs. 14-15, cursor 133 remains stationary in first position P1 when in inner region 185 and independent from the adjustment of the FOV. However it is understood that the cursor 133 may be moved from first position P1 when located when in inner region 185 as well.

FIG. 15 illustrates cursor 133 after the FOV of displayed portion 137 is adjusted such that cursor 133 has been moved from first position P1 in inner region 185 (FIG. 14) to second position P2 in outer region 187. Cursor 133 is moved in the same direction as the adjustment of the FOV from first position P1 to second position P2. The FOV has been scrolled to the right as shown, which causes cursor 133 to move from first position P1 to second position P2.

The FOV of displayed portion 137 has been scrolled such that outer periphery 189 of viewable output 130 is shown on display 122, and the FOV of displayed portion 137 is unable to scroll further to the right. Position P2 of cursor 133 is located on outer periphery 189 of viewable output 130. A selectable object 191 located along outer periphery 189 is positioned under cursor 133 when cursor 133 is in second position P2. In the embodiment as shown, selectable object 191 is a scrollbar. A user may drag the scrollbar using cursor 133 to view different portions of the Internet webpage. Thus, cursor 133 may be adjusted to second position P2 to select objects located near or on the outer periphery 189 of viewable output 130 when the FOV is unable to scroll further right.

Cursor 133 can be controlled by event driven programming. Event driven programming detects an event, such as when cursor 133 approaches outer region 187 (FIG. 14). The event driven program then responds to the event accordingly by executing code, and cursor 133 moves from the first position P1 to the second position P2 (FIG. 15). The event driven programming can be written in many different types of programming code, such as, for example, Visual Basic or Java. A more detailed explanation of event driven programming is provided in D. S. Malik, Java Programming: *From Problem Analysis to Program Design*, Boston: Course Technology, Cengage Learning, 2010, which is herein incorporated by reference in its entirety.

Although FIG. 15 illustrates the FOV of displayed portion 137 and cursor 133 being scrolled to the right, those skilled in the art will appreciate that the FOV of displayed portion 137 and cursor 130 may be adjusted in any direction. For example, referring to viewable output 130 shown in FIG. 11, a user may scroll from FOV 168 to FOV 174, FOV 176, or FOV 178 upward, downward, or to the left, respectively.

Figure 16:
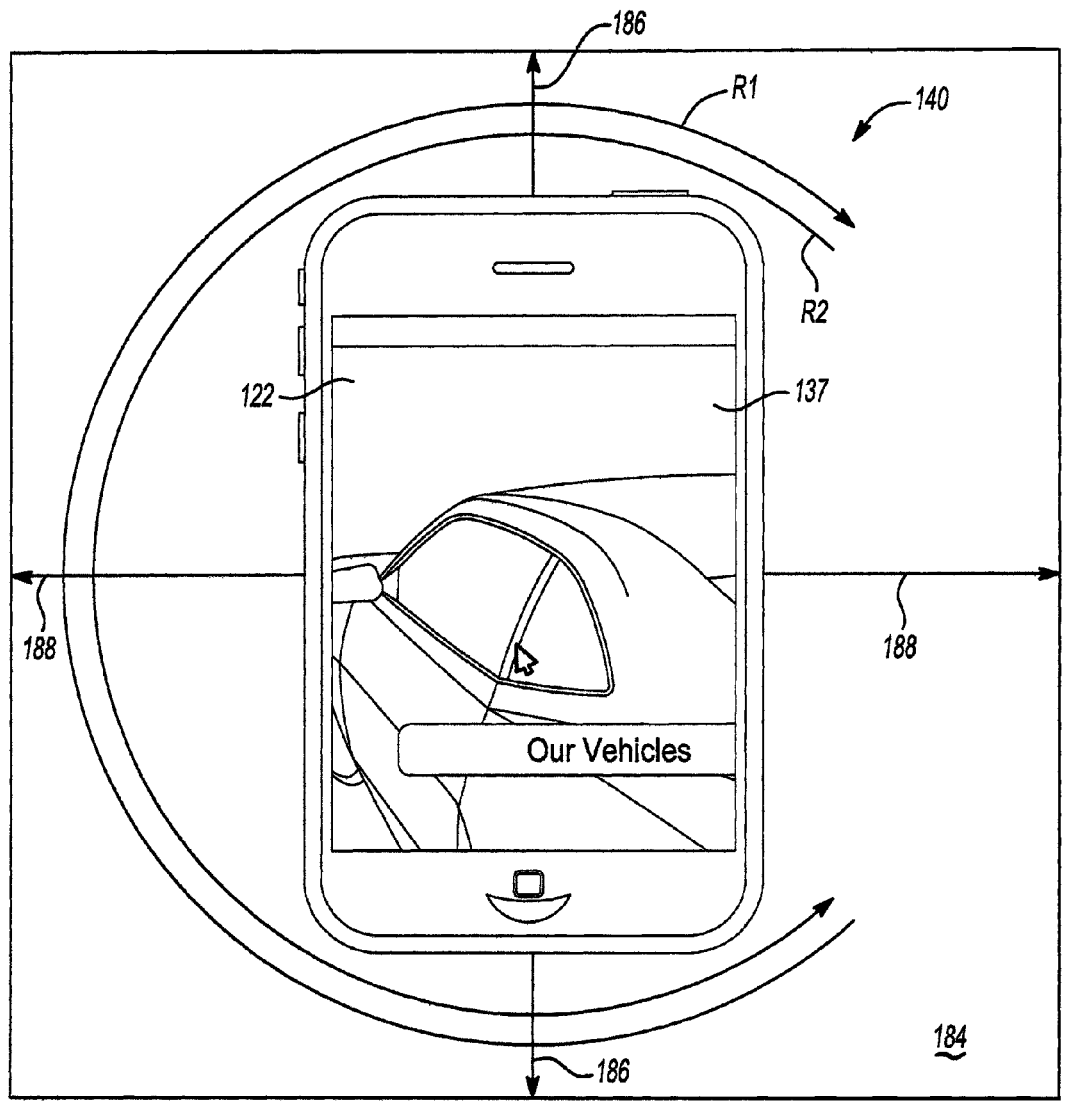
FIG. 16 is an isometric view of the smartphone shown in FIG. 9 illustrating a set of motions that may be utilized to transition between the FOVs shown in FIGS. 10-12.

FIG. 16 illustrates a first exemplary manner in which controller 126 may be configured to adjust the FOV of displayed portion 137 based upon the movement of smartphone 140 as detected by motion sensor 124. In this particular exemplary embodiment, motion sensor 124 (FIG. 8) of smartphone 140 is an optical sensor. The optical sensor can be fixedly mounted on a back side of smartphone 140, and configured to detect movement of smartphone 140 relative to an underlying surface. For example, a user may place the back side of smartphone 140 on an underlying surface such as a mousepad. Motion sensor 124 is configured to measure the movement of smartphone 140 within a first plane 184; i.e., along a longitudinal axis 186 and a first transverse axis 188. In the embodiment as illustrated, plane 184 represents an underlying surface, such as a mousepad, where the back side of handheld electronic device 140 is moved about plane 184. Plane 184 may be substantially parallel (or perpendicular) to ground however, it will be appreciated that the orientation of plane 184 with respect to ground may vary amongst different embodiments.

Controller 126 (FIG. 8) includes control logic for adjusting the FOV of displayed portion 137 based upon device movement in the following manner: when motion sensor 124 indicates that smartphone 140 is being moved along longitudinal axis 186 in a first direction (upward in the context of FIG. 16), controller 126 scrolls the FOV of displayed portion 137 upward. When motion sensor 124 detects that smartphone 140 is being moved along longitudinal axis 186 in a second opposite direction (downward in the context of FIG. 16), controller 126 scrolls the FOV of displayed portion 137 downward. When motion sensor 124 detects that smartphone 140 is being moved along first transverse axis 188 in a first direction (left in the context of FIG. 16), controller 126 scrolls the FOV of displayed portion 137 to the left. Finally, when motion sensor 124 indicates that smartphone 140 is being moved along first transverse axis 188 in a second opposite direction (right in the context of FIG. 16), controller 126 scrolls the FOV of displayed portion 137 to the right. Thus, referring to viewable output 130 shown in FIG. 11, a user may scroll from FOV 168 to FOV 174, FOV 176, FOV 178, or FOV 180 by moving smartphone 140 upward, downward, to the left, or to the right, respectively.

Controller 126 may be configured to adjust the FOV of displayed portion 137 based on a rotational movement of smartphone 140 within plane 184 as well. For example, when motion sensor 124 indicates that smartphone 140 is being rotated within plane 184 in rotary directions R1 and R2, controller 126 rotates the FOV of displayed portion 137. Thus, referring to viewable output 130 as shown in FIG. 12, a user may rotate from FOV 182 to FOV 181 or to FOV 183 by rotating smartphone 140 to the right and left, respectively.

Controller 126 may also be configured to adjust the scale of the FOV of displayed portion 137 based upon the movement of smartphone 140 in plane 184 as well. In one example, a user may select a particular setting using a user input device 132 (FIG. 8) such that if optical sensor 150 indicates that smartphone 140 is being moved along plane 184, controller 126 adjusts the scale of the FOV of displayed portion 137. In one embodiment, if motion sensor 124 detects that smartphone 140 is being moved along longitudinal axis 186 in a first direction (upward in the context of FIG. 16), controller decreases the scale the FOV of displayed portion 137 (i.e., zooms out). In contrast, when motion sensor 124 detects that smartphone 140 is being moved in a second opposite direction along longitudinal axis 186 (downwardly in the context of FIG. 16), controller 126 increases the scale the FOV of displayed portion 137 (i.e., zooms in). In another embodiment, controller 126 may adjust the scale of the FOV of displayed portion 137 based motion along first transverse axis 188. Thus, referring to viewable output shown in FIG. 10, a user may transition from FOV 168 to FOV 172 or FOV 170 by moving smartphone 140 along plane 184.

In one exemplary embodiment, smartphone 140 may be used as an external controller for a computing system such as a PC. That is, smartphone 140 is in communication with a computing system including a microprocessor and a viewable screen, where smartphone 140 is used in a similar manner to a conventional mouse device. The cursor as well as the viewable output generated by the software application is shown on the viewable screen of the computing device instead of display 122. In this example, a user places the back side of smartphone 140 on an underlying surface such as a mousepad. Display 122 is configured to call out mouse buttons, where different regions of display 122 may represent the hardware on a conventional mouse device. For example, the upper left hand portion of display 122 could function as the left button on a convention mouse, the upper right hand portion of the display could function as the right button on a conventional mouse, and the lower left hand portion of the mouse could functions as a zooming device. As display 122 is a touchscreen, a user may contact display 122 to select different portions of the display.

Figure 17:
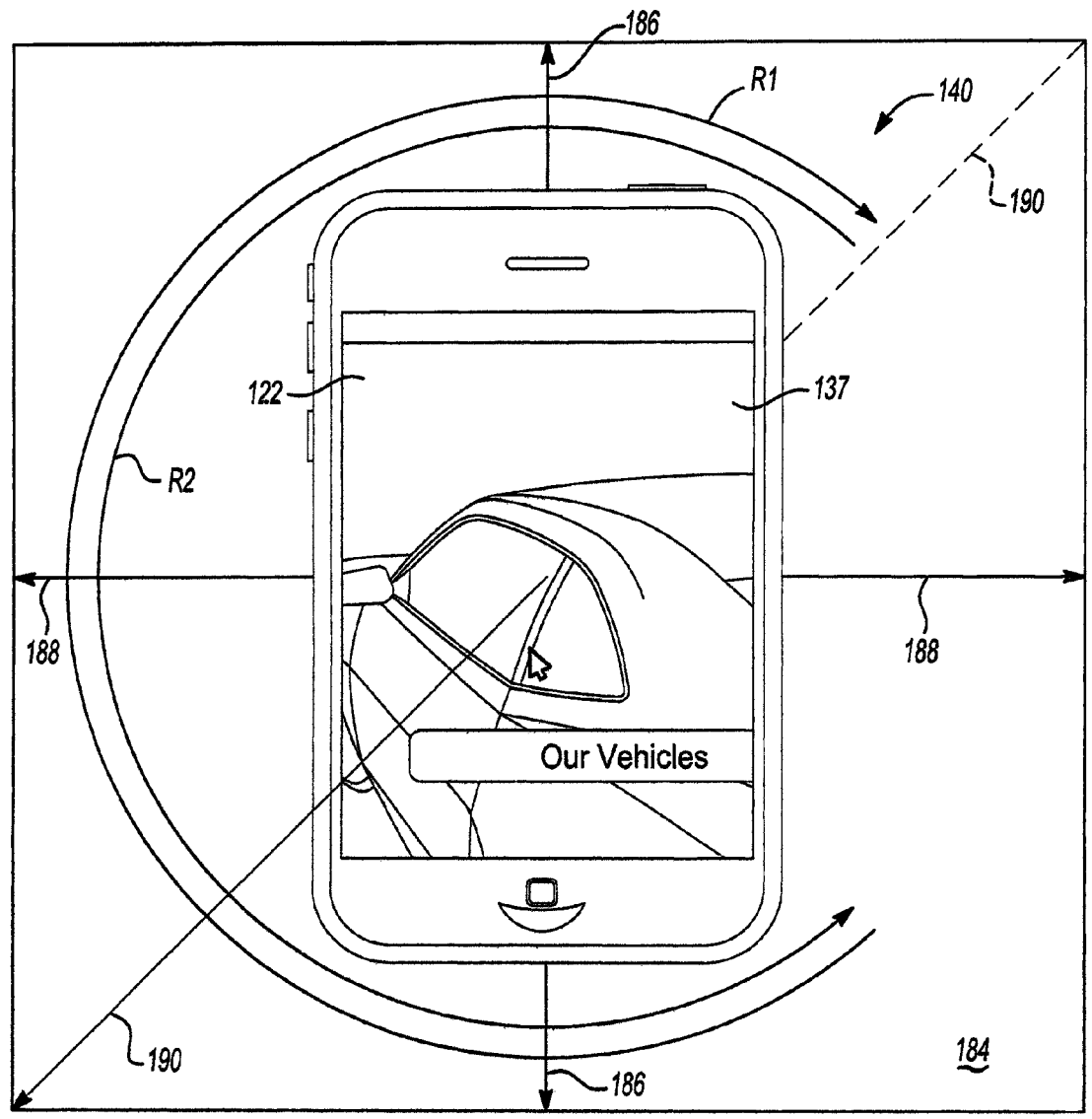
FIG. 17 is an isometric view of the keyfob shown in FIG. 9 illustrating a second set of motions that may be utilized to transition between the FOVs shown in FIGS. 10-12.

FIG. 17 illustrates a second exemplary manner in which controller 126 may be configured to adjust the FOV of displayed portion 137 based upon the movement of smartphone 140 as detected by motion sensor 124. In this particular exemplary embodiment, motion sensor 124 (FIG. 8) of smartphone 140 is an accelerometer configured to measure the movement of smartphone 140 within first plane 184; i.e., along longitudinal axis 186 and first transverse axis 188. If desired, motion sensor 124 may also be configured to measure the movement of smartphone 140 along a second traverse axis 190. Plane 184 may be substantially perpendicular (or parallel) to ground, and second transverse axis 190 may be substantially perpendicular to plane 184; however, it will be appreciated that the orientation of plane 184 and second transverse axis 190 with respect to each other and with respect to ground may vary amongst different embodiments.

Controller 126 (FIG. 8) may adjust the FOV of displayed portion 137 based upon device movement in plane 184. For example, when motion sensor 124 indicates that smartphone 140 is being moved along longitudinal axis 186, controller 126 scrolls the FOV of displayed portion 137 upward or downward depending on the direction of movement. When motion sensor 124 detects that smartphone 140 is being moved along first transverse axis 188, controller 126 scrolls the FOV of displayed portion 137 to the left or right, depending on the direction of movement. Controller 126 may be configured to adjust the FOV based on a rotational movement of smartphone 140 within plane 184 as well. For example, when motion sensor 124 indicates that smartphone 140 is being rotated within plane 184 in rotary directions R1 and R2, controller 126 rotates the FOV of displayed portion 137.

Controller 126 may also be configured to adjust the scale of the FOV of displayed portion 137 based upon the movement of smartphone 140 along second transverse axis 190. For example, when motion sensor 124 indicates that smartphone 140 is being moved along second transverse axis 190 in a first direction (toward the viewer in the context of FIG. 17), controller 126 decreases the scale the FOV of displayed portion 137 (i.e., zooms out). In contrast, when motion sensor 124 detects that smartphone 140 is being moved along second transverse axis 190 in a second opposite direction (away from the viewer in the context of FIG. 17), controller 126 increases the scale the FOV of displayed portion 137 (i.e., zooms in). Thus, referring to viewable output shown in FIG. 10, a user may transition from FOV 168 to FOV 172 or FOV 170 by moving smartphone 140 generally toward or away from the user's body, respectively.

The description of the invention is merely exemplary in nature and variations that do not depart from the gist of the invention are intended to be within the scope of the invention. Such variations are not to be regarded as a departure from the spirit and scope of the invention.

What is claimed is:

1. A handheld electronic device, comprising:
   a display;
   a memory configured for storing a viewable output of at least one software application;
   a motion sensor configured to monitor the movement of the handheld electronic device, and wherein the motion sensor includes one of an accelerometer or gyroscope; and
   a controller in communication with the display, the memory, and the motion sensor, wherein the controller includes:
      a first control logic generating a first image on the display representative of a portion of the viewable output of the software application, the first image having a field of view (FOV), and wherein the viewable output includes an inner region and an outer region, the inner region surrounded at least in part by the outer region, and the outer region includes a scrollbar located on the outer periphery;
      a second control logic for adjusting the FOV of the first image based upon movement of the handheld device detected by the motion sensor;
      a third control logic for displaying an image of a cursor in a first position in the inner region when the inner region is within the FOV of the first image; and
      a fourth control logic for displaying the image of a cursor in a second position in the outer region when a portion of the inner region and the outer region are within the FOV of the first image and when the FOV is unable to scroll further, and wherein the scrollbar is positioned under the image of the cursor when the image of the cursor is in the second position.

2. The handheld device according to claim 1 wherein the image of the cursor is continuously displayed on the first image as the FOV of the first image is adjusted.

3. The handheld electronic device according to claim 1 wherein the motion sensor is one of an accelerometer, an infrared sensor, and an optical sensor.

4. The handheld electronic device according to claim 1 wherein the motion sensor is configured to monitor the movement of the handheld electronic device within a first plane.

5. The handheld electronic device according to claim 4 wherein the controller is configured to scroll the FOV based upon the movement of the handheld electronic device within the first plane.

6. The handheld electronic device according to claim 4 wherein the controller is configured to adjust the scale of the FOV based upon the movement of the handheld electronic device within the first plane.

7. The handheld electronic device according to claim 5 wherein the motion sensor is further configured to monitor the movement of the handheld electronic device along an axis substantially perpendicular to the first plane.

8. The handheld electronic device according to claim 7 wherein the controller is configured to adjust the scale of the FOV based upon the movement of the handheld electronic device along the axis.

9. The handheld electronic device according to claim 4 wherein the image of the cursor remains substantially stationary when the FOV of the first image is adjusted and includes only the inner region.

10. A handheld electronic device, comprising:
    a display;
    a memory configured for storing a viewable output of at least one software application;
    a motion sensor configured to monitor the movement of the handheld electronic device, and wherein the motion sensor includes one of an accelerometer or gyroscope; and
    a controller in communication with the display, the memory, and the motion sensor, wherein the controller includes:
    a first control logic generating a first image on the display representative of a portion of the viewable output of the software application, the first image having a field of view (FOV), and wherein the viewable output includes an outer periphery, an inner region and an outer region, the inner region surrounded at least in part by the outer region, and the outer region includes the outer periphery and a scrollbar located outside of the inner region;
    a second control logic for adjusting the FOV of the first image based upon movement of the handheld device detected by the motion sensor;
    a third control logic displaying an image of a cursor in a first position in the inner region when the inner region is within FOV of the first image; and
    a fourth control logic for displaying the image of a cursor in a second position in the outer region and on the outer periphery of the viewable output, where the image of a cursor is in the second position when a portion of the inner region and the outer region are within the FOV of the first image and when the FOV is unable to scroll further.

11. The handheld device according to claim 10 wherein the motion sensor is configured to monitor the movement of the handheld electronic device within a first plane.

12. The handheld device according to claim 11 wherein the image of a cursor remains substantially stationary when the FOV of the first image is adjusted and includes only the inner region.

* * * * *